(12) United States Patent
Vaughan (10) Patent No.: US 6,209,044 B1
(45) Date of Patent: *Mar. 27, 2001

(54) METHOD AND APPARATUS FOR CONTROLLING A DISPLAY MONITOR IN A PC/TV CONVERGENCE SYSTEM (75) Inventor: Mark P. Vaughan, Spring, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/204,618

(22) Filed: Dec. 1, 1998

Related U.S. Application Data (63) Continuation of application No. 08/829,151, filed on Mar. 31, 1997, now Pat. No. 6,047,121.

(51) Int. Cl.[7] .................. G06F 13/00; G06F 3/00
(52) U.S. Cl. ...................... 710/14; 710/5; 710/8; 710/10; 709/105; 709/106
(58) Field of Search .................. 710/8, 10, 14, 710/5; 395/674, 675; 709/105, 106

(56) References Cited

U.S. PATENT DOCUMENTS

| 3,792,447 | * | 2/1974 | Beltz et al. | 710/21 |
|---|---|---|---|---|
| 4,628,541 | | 12/1986 | Beavers | 359/142 |
| 4,656,644 | * | 4/1987 | Ozaki | 375/232 |
| 4,658,247 | | 4/1987 | Gharachorloo | 345/196 |
| 4,775,928 | | 10/1988 | Kendall et al. | 713/310 |
| 4,954,819 | | 9/1990 | Watkins | 345/340 |
| 5,129,683 | * | 7/1992 | Briet | 285/93 |
| 5,291,275 | | 3/1994 | Lumelsky | 348/441 |
| 5,428,671 | * | 6/1995 | Dykes et al. | 379/93.32 |
| 5,451,981 | | 9/1995 | Drako et al. | 345/118 |
| 5,488,393 | | 1/1996 | Wood et al. | 345/213 |
| 5,502,462 | | 3/1996 | Mical et al. | 345/507 |
| 5,543,824 | | 8/1996 | Priem et al. | 345/508 |
| 5,572,339 | * | 11/1996 | Edgar et al. | 358/494 |
| 5,572,698 | | 11/1996 | Yen et al. | 711/110 |
| 5,610,663 | | 3/1997 | Nan et al. | 348/542 |
| 5,748,895 | * | 5/1998 | Shiff et al. | 713/100 |
| 6,047,121 | * | 4/2000 | Vaughan | 395/674 |

OTHER PUBLICATIONS

Phase–locked loop; NE/SE54/ Philips Semiconductors; Aug. 31, 1994; pp. 1–9.
Application Note/AN177; "An Overview of the Phase–Locked Loop(PLL)"; Philips Semiconductors; Dec. 1988; pp. 1–6.
Application Note/AN179; "Circuit Description of the NE564"; Philips Semiconductors; Dec. 1991; pp. 1–6.

(List continued on next page.)

Primary Examiner—Thomas C. Lee
Assistant Examiner—Tammara Peyton
(74) Attorney, Agent, or Firm—Sharp, Comfort & Merrett, P.C.

(57) ABSTRACT

A computer system comprising a display monitor including an audio function and a computer coupled to the display monitor including a computer controller for controlling the audio function in the monitor. The computer is operable in a computer mode, a television mode, and a combination computer/television mode for displaying computer and television information on the monitor. The system determines whether the monitor includes a controller for controlling its audio function. Based upon this determination, the system controls the audio function with the audio controller in the monitor if the monitor includes such a controller or, alternatively, with the computer controller if the monitor does not have such a controller.

22 Claims, 4 Drawing Sheets

OTHER PUBLICATIONS

Application Note/AN180; "Frequency Synthesis with the NE564"; Philips Semiconductors; Dec. 1988; pp. 1–3.

Application Note/AN182; "Clock Regenerator with Crystal–Controlled Phase–Locked Loop VCO (NE564)"; Philips Semiconductors; Dec. 1991; pp. 1–10.

"Gateway 2000 Sells Destination™ Big Screen PC Through Retail Chains"; Internet Article; Aug. 20, 1996; pp. 1–4.

"Gateway 2000 Launches Destination™ Big Screen PC Featuring 31–inch Monitor"; Internet Article; Mar. 21, 1996; pp. 1–5.

"The Big–Tube PCTV"; PC Online/Trends Online; May 28, 1996; pp. 1–3.

"Destination Features"; Internet Article; Aug. 21, 1996; pp. 1–5.

"Telefuzion"; Internet Article; Mar. 12, 1997; pp. 1–2.

"High–Tech; Now you can tune your TV to the Internet"; Mike Snider; USA Today; Sep. 18, 1996; pp. 1–2.

"Advanced Power Management (APM)"; BIOS Interface Specification; Revision 1.1; Sep. 1993; pp. 1–59.

* cited by examiner

METHOD AND APPARATUS FOR CONTROLLING A DISPLAY MONITOR IN A PC/TV CONVERGENCE SYSTEM

This application is a continuation of application Ser. bNo. 08/829,151, filed Mar. 31, 1997, now U.S. Pat. No. 6,047,121.

BACKGROUND OF THE INVENTION

1. Field of the Invention

The present invention relates to a method and apparatus for controlling a peripheral device and, more particularly, to a system and method for controlling a display monitor in a computer system.

2. Description of the Related Art

A personal computer/television (PC/TV) convergence system is a fully functional computer integrated with television functionality, providing TV viewing (via broadcast, cable, satellite, VCR, digital disk, or other broadcast media) and personal computing functionality.

A PC/TV convergence device may comprise a fully functional computer including memory, microprocessors, hard drives, floppy drives, fax-modems, CD-ROM player, keyboard, monitor, power supply, mouse, gamepad/joy stick, microphone, etc. The computer is interfaced with a National Television Standards Committee (NTSC) signal which is converted to a scan "video graphics adapter" (VGA) signal or the computer's scan VGA signal is converted to an NTSC interface signal.

The PC/TV convergence device is controlled by the computer's operating system (OS). Thus, the monitor can display both TV programs and computer applications either at the same time or separately. Furthermore, the convergence of the functionality of a PC and a TV into a single system also permits the utilization of the communications bandwidth, mass storage and graphics application of the computer to deliver, store and display applications within a television viewing environment.

The PC/TV is a user interactive device. For example, if a user is watching TV, the PC/TV will be able to download information from another source (besides a TV station) information about, among other things, the TV program. Such information can originate from a web site or via phone lines or other data providers.

At present, when televisions and personal computers are separate devices, TVs typically incorporate a remote control. A standard TV remote control may control a variety of television functions or other related functions by communicating control information or infrared (IR) signals to the TV to indicate which button on the remote control was depressed.

When converging the functionality of a computer and a television, current computer convergence systems have retained use of a TV remote control as well as separate control of computer functions and television functions. As a result, such systems utilize display monitors having controllers responsive to a TV remote for controlling the various functions of the display monitors, such as volume if the monitor includes speakers, brightness, contrast, etc. However, when a user wishes to couple a display monitor to the system which does not include any controllers responsive to a TV remote or does not include certain functions, such as audio, then such functions must be controlled and provided by other means for proper operation of the system. Thus, what is needed is a computer system which recognizes the type of display monitor being used and, in particular, determines if a monitor includes controllers which are responsive to a TV remote for controlling the various functions of the monitors wherein the system uses a computer to control such functions if the monitor does not include such controllers.

SUMMARY OF THE INVENTION

Accordingly, the present invention overcomes the above-identified problems as well as other shortcomings and deficiencies of existing technologies by providing a method for controlling a peripheral device. The method comprises the steps of providing a peripheral device including at least one function; providing a computer operably associated with the peripheral device including a computer controller for controlling the function; determining whether the peripheral device includes a peripheral controller for controlling the function; and controlling the function of the peripheral device with the peripheral controller if the peripheral device includes the peripheral controller or, alternatively, with the computer controller if the peripheral device does not include the peripheral controller.

The present invention also provides a computer system comprising a peripheral device including at least one function; a computer operably associated with the peripheral device including a computer controller for controlling the function; a sensing means for determining whether the peripheral device includes a peripheral controller for controlling the function; and control means responsive to said sensing means for controlling the function with the peripheral controller if the peripheral device includes the peripheral controller or, alternatively, with the computer controller if the peripheral device does not include the peripheral controller.

The present invention also provides a computer system comprising a peripheral device including at least one function and a computer operably associated with the peripheral device including a computer controller for controlling the function. The computer is operable in a computer mode for receiving and transmitting computer information, a television mode for receiving and transmitting television information and a combination computer/television mode for receiving and transmitting computer and television information. The computer system further comprises sensing means for determining whether the peripheral device includes a peripheral controller for controlling the function. The computer system further includes control means responsive to said sensing means for controlling the function with the peripheral controller if the peripheral device includes the peripheral controller or, alternatively, with the computer controller if the peripheral device does not include the peripheral controller.

BRIEF DESCRIPTION OF THE DRAWINGS

Other advantages, features, and characteristics of the present invention, as well as methods, operation, and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

With reference now to the figures wherein like or similar elements are designated with identical reference numerals, there are depicted block diagrams illustrating a method and system according to the present invention. The purpose of these block diagrams is to illustrate the features of the invention and the basic principles of operation of an embodiment thereof. These block diagrams are not necessarily intended to schematically represent particular modules of circuitry or any particular data or control paths.

Figure 1:
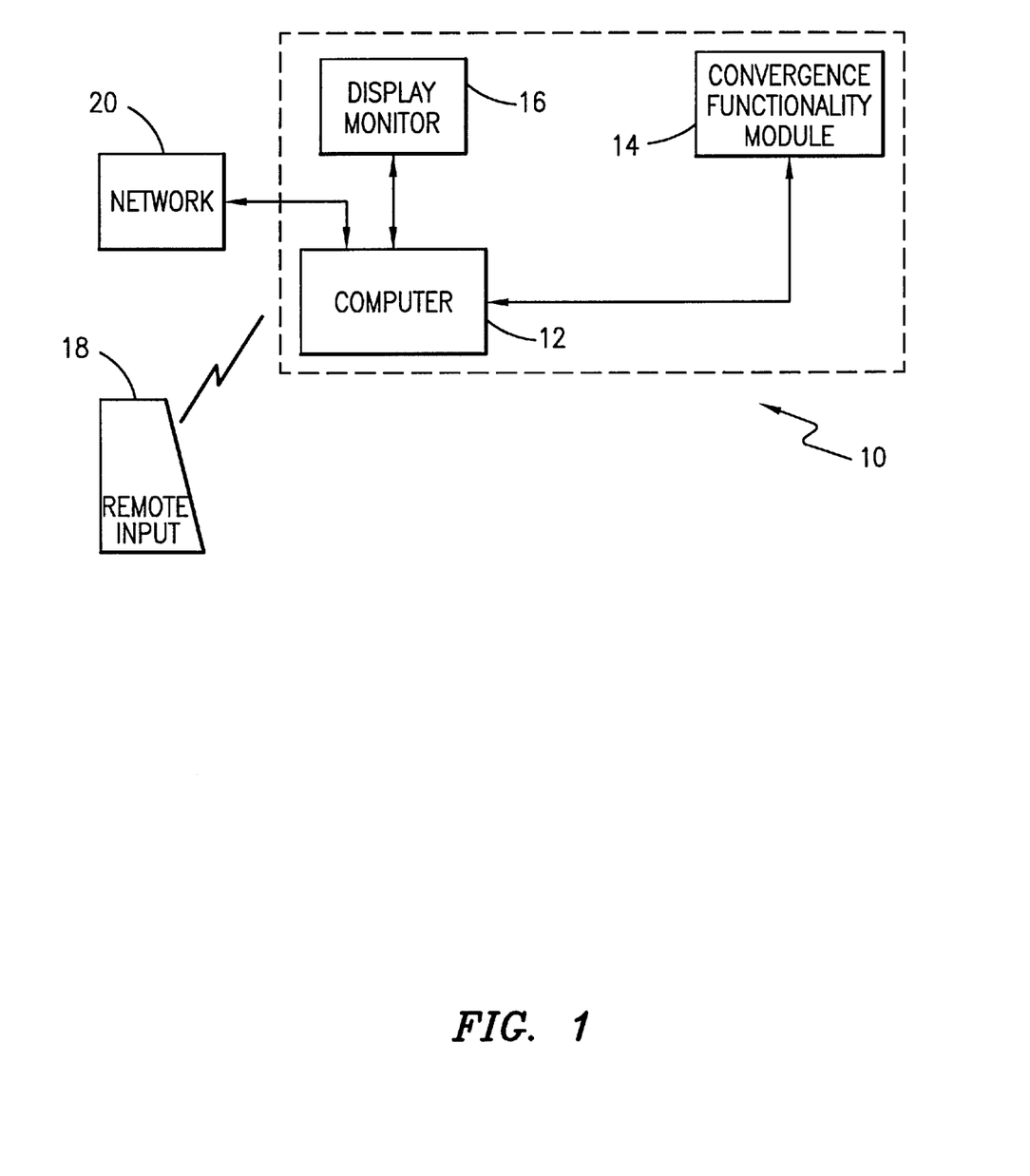
FIG. 1 is a block diagram illustrating a computer system in accordance with the present invention.

Referring now to FIG. 1, there is shown a block diagram illustrating a computer system 10. Computer system 10 includes a computer 12, a convergence functionality module 14, a display monitor 16 and a remote input 18.

Computer 12 may preferably be a personal computer, and although not shown in FIG. 1, includes a processor, memory, data retrieval and storage media and communication data ports. Display monitor 16 is operable to receive and display video signals received from computer 12 and may include an audio output system for playing audio signals received from computer 12 as will be described in greater detail in connection with FIGS. 3A and 3B.

Computer 12 is coupled to convergence functionality module 14 that is operable to receive or generate data signals, such as video, audio, and graphic information. For example convergence functionality module 14 may comprise a television module or receiver, decoder or tuner capable of receiving television information or signals in the form of the National Television Standards Committee (NTSC) or Phase Alteration Line (PAL) forms, from any medium such as from a cable system or from a digital satellite system. Convergence functionality module 14 could also include various other electronic devices such as consumer electronic units. For example, convergence functionality module 14 could also include video gaming units and other direct audio/video sources such as video cassette recorders (VCRs), and video disk player/recorders, including digital versatile disk (DVD) player/recorders.

Computer system 10 may preferably be operated by a user using wireless remote input 18 operating, for example, via radio waves, infra-red waves or acoustic waves. Remote 18 communicates control information to computer 12 and convergence functionality module 14 to control the operation of computer 12 and convergence functionality module 14. Although good results have been achieved using wireless keyboards and remote controls for remote input 18, it is contemplated that any input device, wireless or hardwired, could be used to operate computer system 10.

Still referring to FIG. 1, computer system 10 is configurable to be connected and communicate with a network 20. It is contemplated that network 20 could be any type of network, including a Local Area Network, a Wide Area Network and the Internet.

In general operation, computer system 10 can be operated in various modes. Assuming now that converged functionality module 14 comprises essentially a television module or receiver, computer system 10 can be operated in a computer mode, a television mode, and a combination computer/television mode. Computer system 10 is operable in the television mode and the combination computer/television mode for receiving and transmitting television information. When in a television mode, personal computer 12 processes the audio and video information received or generated by television module 14, and outputs the corresponding information on display monitor 16. At least two viewing surfaces are possible when computer system 10 is being operated in the television mode, a primary viewing surface and a secondary viewing surface. The displayed image of the primary viewing surface fills the entire viewing screen, with only a portion of the screen dedicated to the viewing of the secondary viewing surface, such as a picture-in-picture (PIP).

Computer system 10 is operable in the computer mode and the combination computer/television mode for receiving, storing and transmitting computer information. When computer system 10 is being operated in the computer mode, computer 12 is utilized to perform computer functions, including executing and running software and interfacing with network 20, with the output of computer 12 being displayed on display monitor 16.

When computer system 10 is being operated in the combination computer/television mode, the functionality of computer 12 and television module 14 are both utilized including simultaneously displaying computer information and the television information on display monitor 16.

Figure 2:
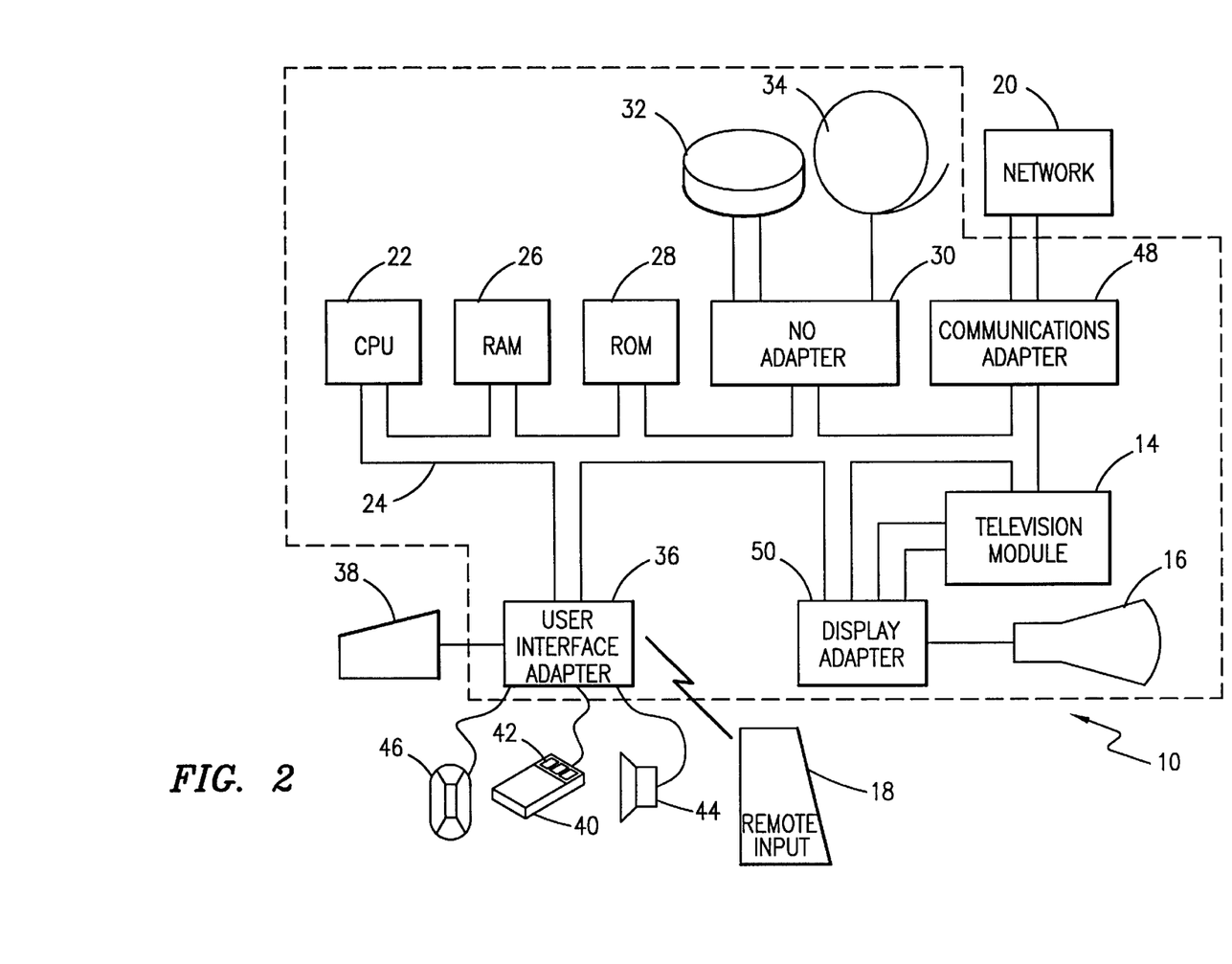
FIG. 2 is a block diagram illustrating an exemplary embodiment of a computer system as is illustrated in FIG. 1.

Referring now to FIG. 2, there is shown a more detailed block diagram of an exemplary embodiment of computer system 10. Reference numerals used in FIG. 2 which are like, similar, or identical to reference numerals used in FIG. 1 indicate like, similar, or identical components as depicted in this exemplary embodiment.

Computer system 10 includes at least one processor or central processing unit (CPU) 22. CPU 22 is interconnected via system bus 24 to random access memory (RAM) 26, read-only memory (ROM) 28, and input/output (I/O) adapter 30 for connecting peripheral devices such as disk units 32 and tape drives 34 to bus 24, user interface adapter 36 for connecting a hardwire keyboard 38, mouse 40 having one or more buttons 42, speaker 44, microphone 46, and/or other user interface devices such as a touch screen device (not shown) to bus 24, communication adapter 48 for connecting computer system 10 to network 20, and display adapter 50 for connecting bus 24 to display monitor 16. User interface adapter 36 is also adapted to receive control information from remote input 18. Computer system 10 further includes a television module 14 coupled to bus 24 and display adapter 50 for receiving television information from network 20 via communications adapter 48 and providing or transmitting the television information to display adapter 50 for display on display monitor 16.

In the following description, for purposes of explanation, specific program procedures, APIs and configurations are set forth to provide a thorough understanding of the present invention. The exemplary embodiment described herein is implemented with a Windows 95 operating system created by Microsoft Corporation (Windows and Windows 95 are trademarks of Microsoft Corporation) and an Intel Corporation X86 series microprocessor. However, it will be apparent to one skilled in the art that the present invention may be practiced without specific details and be implemented in various computer systems having various processors utilizing various operating systems, and in various configurations or makes or models of tightly coupled processors or in various configurations of loosely coupled multiprocessor systems. Procedural descriptions and representations which follow are the means used by those skilled in the art to convey the substance of their work to others skilled in the art.

Figure 3A:
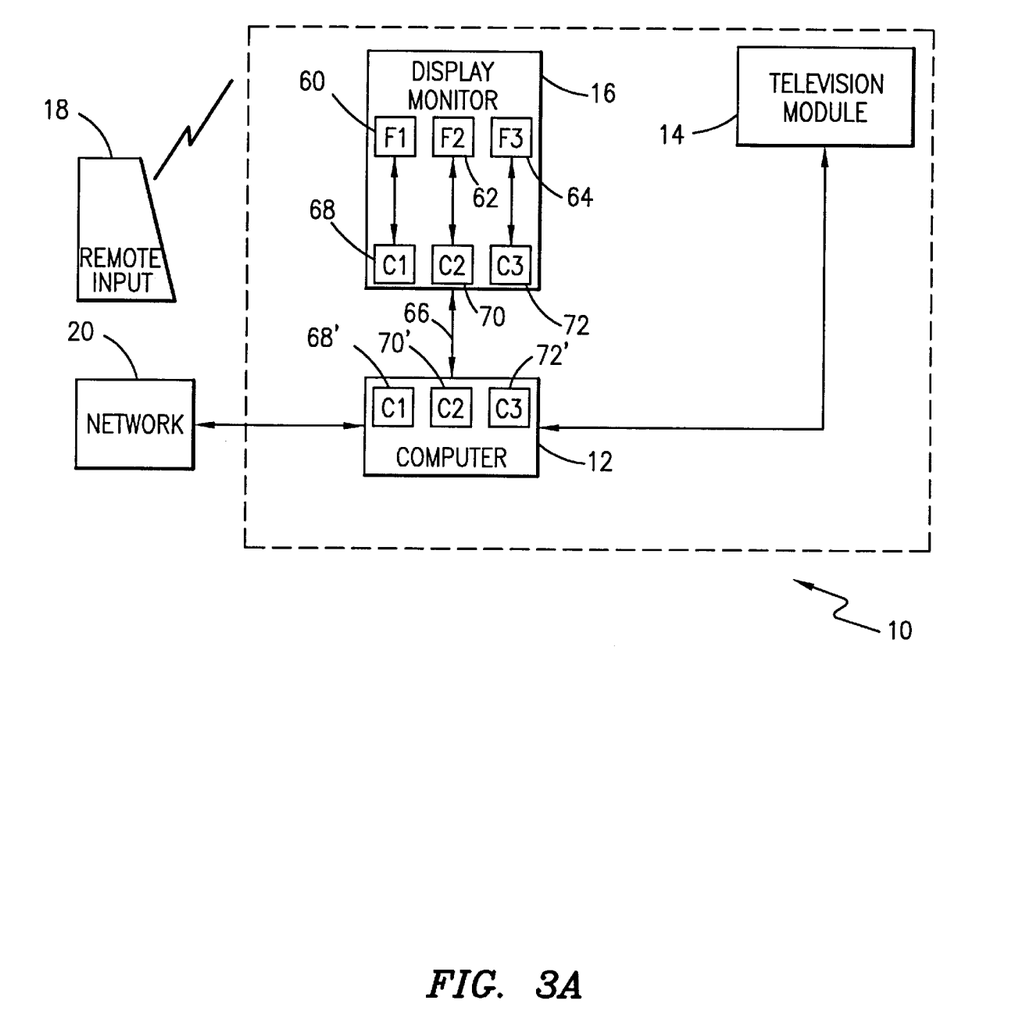
FIGS. 3A and 3B illustrate exemplary embodiments illustrating the present invention.
Figure 3B:
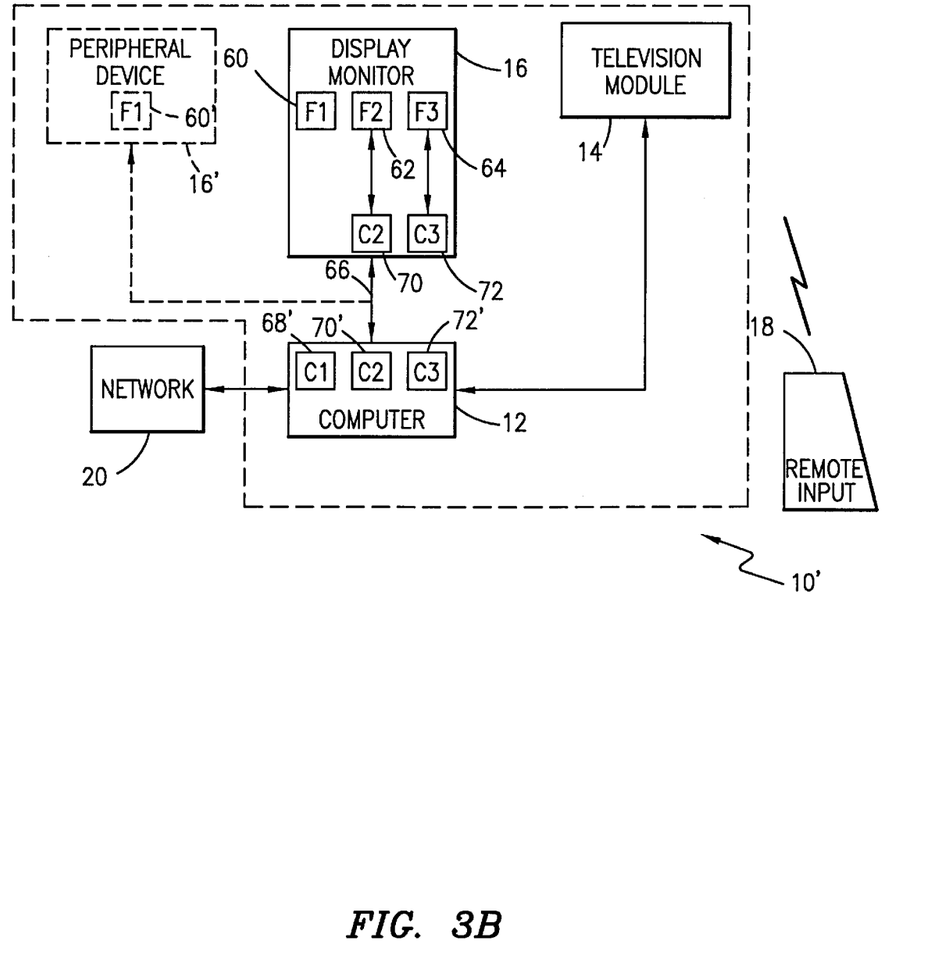

Referring now to FIGS. 3A and 3B, there are shown two exemplary embodiments illustrating the present invention wherein reference numerals which are like, similar or identical to reference numbers used in FIGS. 1 and 2 indicate like, similar or identical components. Referring first to FIG. 3A, display monitor 16 includes one or more functions 60, 62, 64. For example, function 60 is an audio function, i.e., monitor 16 may include one or more speakers for generating sound in response to an audio signal received from computer 12 via a bus 66. Although bus 66 may be any type of bus for coupling a computer to a peripheral device, such as monitor 16, good results have been achieved using an I²C (inter-integrated circuit) bus. Also, the audio signal received from computer 12 is a single level or fixed level signal. Thus, audio function 60 is operatively associated with and coupled to an audio controller 68, such as an amplifier, for controlling the volume of speakers for implementing audio function 60 by amplifying the fixed level audio signal received from computer 12 via bus 66 in response to remote input 18. Function 62 is a display-geometry function, which effects the physical geometry of information displayed on monitor 16 such as vertical and horizonal display position and vertical and horizontal display size. Display-geometry function 62 is operatively associated with and coupled to a display-geometry controller 70, such as a horizontal/vertical position controller and a horizontal/vertical size controller. Function 64 is a display-quality function which effects the physical quality of information displayed on monitor 16 such as display brightness, contrast, color, hue, sharpness and color temperature. Display-quality function 64 is operatively associated with and coupled to a display-quality controller 72, such as a brightness controller or contrast controller.

According to the invention, computer 12 includes an audio controller 68', a display-geometry controller 70', and a display-quality controller 72' corresponding to audio controller 68, display-geometry controller 70 and display-quality controller 72, respectively, in monitor 16. Audio controller 68', display-geometry controller 70' and display-quality controller 72' are operatively associated with and coupled to functions 60, 62, 64 from computer 12 instead of internally within monitor 16. Controllers 68', 70' and 72' provide a duplicate means for controlling functions 60, 62, 64 of monitor 16 from computer 12. For example, instead of computer 12 sending a fixed level audio signal via bus 66 to controller 68 and remote input 18 being used to send control information to controller 68 to cause controller 68 to raise or lower audio volume, computer 12 sends a multiple level, non-fixed level audio signal directly to controller 68 to cause controller 68 to raise or lower audio volume.

Referring now to FIG. 3B wherein reference numerals which are like, similar or identical to reference numbers used in FIG. 3A indicate like, similar or identical components, monitor 16' does not include audio controller 68 for audio function 60. Thus, remote input 18 cannot be used to directly control audio function 60 in monitor 16' but instead must be used to control audio function 60 from computer 12. In other words, function 60 must be controlled by controller 68' in computer 12 via bus 66. According to the invention, computer 12 determines whether monitor 16, 16' is a particular type or belongs to a selected set of monitors. In particular, computer 12 determines whether monitor 16, 16' includes controller 68 or function 60. If monitor 16 includes controller 68 as shown in FIG. 3A, then function 60 is controlled by controller 68 in monitor 16 instead of controller 68' in computer 12. If monitor 16' does not include controller 68 as shown in FIG. 3B, then function 60 is controlled by controller 68' in computer 12 instead of controller 68. If monitor 16' does not include controller 68 or function 60 and a second peripheral device 16" includes function 60' but does not include controller 68, then function 60' is controlled by controller 68' in computer 12 as shown by dotted lines in FIG. 3B. In other words, if monitor 16' is not equipped with speakers, audio function 60 may be implemented in another peripheral device that includes speakers. Peripheral devices 16, 16', 16" may include a signature tag stored in memory which can be read by computer 12 to determine type or whether the peripheral devices have certain functions or function controllers. Peripheral device identification is well known in the art and, for this reason, will not be described in any greater detail.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 26 of one or more computer systems configured generally as described in FIG. 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An article of manufacture for controlling a function of a peripheral device, the article of manufacture comprising:
   at least one computer readable medium; and
   instructions contained on the at least one computer readable medium, the instructions configured to be readable from the at least one computer readable medium by at least one processor and thereby cause the at least one processor to operate so as to:
      determine whether the peripheral device includes a peripheral controller for controlling the function of the peripheral device; and
      responsive to the determination that the peripheral device does not include a peripheral controller, control the function of the peripheral device with a computer controller.

2. The article of manufacture of claim 1, wherein the instructions are configured to cause the at least one processor to further operate so as to:
   responsive to the determination that the peripheral device includes a peripheral controller, control the function of the peripheral device with the peripheral controller.

3. The article of manufacture of claim 1, wherein the function of the peripheral device is a display-quality function.

4. The article of manufacture of claim 1, wherein the function of the peripheral device is a display-geometry function.

5. The article of manufacture of claim 1, wherein the function of the peripheral device is an audio function.

6. A computer system for at least adjusting a function of a peripheral device, the computer system comprising:
   an instruction receiver for receiving an instruction transmitted by an instruction transmitter, the received instruction for selectively adjusting a functional parameter associated with operation of the peripheral device by signals supplied from the computer system;

a communication link connected to the peripheral device; and a processor connected to the instruction receiver and the communication link, the processor for:

determining whether the peripheral device is configured to be directly responsive to the instruction transmitted by the instruction transmitter for adjustment of said functional parameter; and responding to the determination that the peripheral device is not configured to be directly responsive to the instruction transmitted by the instruction transmitter, to selectively adjust said functional parameter of the peripheral device in accordance with the received instruction.

7. The computer system of claim 6, further comprising:
a peripheral device controller for selectively adjusting said functional parameter of the peripheral device, the peripheral device controller responsive to the instruction transmitted by the instruction transmitter.

8. The computer system of claim 7, wherein the peripheral device controller is directly responsive to the instruction transmitted by the instruction transmitter.

9. The computer system of claim 6, further comprising:
a convergence functionality module connected to the processor, the convergence functionality module for at least one of generating and transmitting a plurality of types of signals under control of said processor.

10. The computer system of claim 9, wherein the convergence functionality module comprises at least one of:
a television receiver, a gaming unit and a direct audio/video source.

11. The computer system of claim 6, wherein the instruction receiver is configured to receive one of infared and radio frequency instructions from said instruction transmitter.

12. The computer system of claim 6, further comprising:
an instruction transmitter for transmitting instructions receivable by the instruction receiver.

13. A method for selectively adjusting a plurality of functional parameters associated with operation of a peripheral device by a computer, the method comprising the steps of determining whether the peripheral device is configured to adjust each of the functional parameters;

transmitting instructions to adjust the functional parameters; and responsive to a transmitted instruction to adjust at least one of said functional parameters and to the determination that the peripheral device is not configured to adjust said at least one functional parameter, using said transmitted instruction to operate a controller in said computer to adjust said at least one functional parameter of the peripheral device; and responsive to a transmitted instruction to adjust another functional parameter and determination that the peripheral device is configured to adjust said another functional parameter, using said transmitted instruction to operate a controller internal to the peripheral device to adjust said another functional parameter.

14. The method of claim 13, wherein said another functional parameter of the peripheral device is a display-quality functional parameter.

15. The method of claim 13, wherein said another functional parameter of the peripheral device is a display-geometry functional parameter.

16. The method of claim 13, wherein said one functional parameter of the peripheral device is an audio functional parameter.

17. A computer system for at least adjusting respective functions associated with operation of a peripheral device, the computer system comprising:

a processor operable to control supply of operating signals for communication to a peripheral device;

said processor including a plurality of controllers each associated with an individual function affecting operation of the peripheral device by one of said operating signals said controllers operable in response to respective instructions transmitted by an instruction transmitter to selectively adjust said individual functions; and said processor connected to said peripheral device to:
determine whether the peripheral device, when connected to said computer system, is configured to be directly responsive to the respective instructions transmitted by the instruction transmitter for selective adjustment of said individual functions; and respond to the determination that the peripheral device is not configured to be directly responsive to an instructions transmitted by the instruction transmitter for selective adjustment of at least one of said individual functions, to operate the controller associated with said at least one function to selectively adjust said at least one function in accordance with that transmitted instruction.

18. The computer system of claim 17, wherein said operating signals include video signals for generating a display on a display monitor peripheral device, and said individual adjustable functions include a display quality function and a display-geometry function.

19. A computer system comprising:
a peripheral device display monitor and a peripheral device loudspeaker;

a processor operable to control supply of video signals to said peripheral device display monitor and of audio signals to said peripheral device loudspeaker;

said processor including a plurality of controllers operable in response to instructions transmitted by an instruction transmitter to selectively adjust individual functions including picture-quality, picture-geometry and audio-volume modifying operation of the peripheral device display monitor by said video signals and of the peripheral device loudspeaker by said audio signals; and said processor connected to said peripheral device display monitor and said peripheral device loudspeaker to:
to determine whether the peripheral device display monitor and the peripheral device loudspeaker are configured to be directly responsive to the instructions transmitted by the instruction transmitter for selective adjustment of said functions; and operate a said controller to selectively adjust one of said functions in accordance with the transmitted instructions in response to determination by the processor that the peripheral device operation associated with said one function is not directly responsive to instructions transmitted by the instruction transmitter.

20. A computer system comprising:
a peripheral device display monitor and a peripheral device loudspeaker;

a processor operable to control supply of video signals to said peripheral device display monitor and of audio signals to said peripheral device loudspeaker;

controllers operable in response to instructions transmitted by an instruction transmitter to selectively adjust functions including picture-quality, picture-geometry and audio-volume modifying operation of the peripheral device display monitor by said video signals and of the peripheral device loudspeaker by said audio signals; and said processor connected to the controller to:
  determine whether the peripheral device display monitor and the peripheral device loudspeaker are configured to be directly responsive to the instructions transmitted by the instruction transmitter for selective adjustment of said functions; and
  operate said controller to selectively adjust at least one of said functions in accordance with the transmitted instructions in response to determination by the processor that the peripheral device operation associated with said at least one function is not directly responsive to instructions transmitted by the instruction transmitter.

21. The computer system of claim 20, wherein said one function is audio-volume.

22. The computer system of claim 21, wherein said peripheral device loudspeaker is separate from said display monitor peripheral device.

* * * * *